No. 765,713. PATENTED JULY 26, 1904.
F. P. SHAW.
MACHINE FOR PREPARING AND SPINNING WORSTED.
APPLICATION FILED APR. 5, 1904.
NO MODEL. 5 SHEETS—SHEET 1.

WITNESSES
C. E. Spaulding
Channing Whitaker

INVENTOR
Fred P. Shaw

FIG. 18.

No. 765,713. PATENTED JULY 26, 1904.
F. P. SHAW.
MACHINE FOR PREPARING AND SPINNING WORSTED.
APPLICATION FILED APR. 5, 1904.
NO MODEL. 5 SHEETS—SHEET 4.

WITNESSES
C. C. Spaulding
Channing Whitaker

INVENTOR
Fred P. Shaw

No. 765,713. Patented July 26, 1904.

UNITED STATES PATENT OFFICE.

FREDERICK PIERPONT SHAW, OF LOWELL, MASSACHUSETTS, ASSIGNOR TO LOWELL MACHINE SHOP, OF LOWELL, MASSACHUSETTS, A CORPORATION OF MASSACHUSETTS.

MACHINE FOR PREPARING AND SPINNING WORSTED.

SPECIFICATION forming part of Letters Patent No. 765,713, dated July 26, 1904.

Application filed April 5, 1904. Serial No. 201,734. (No model.)

*To all whom it may concern:*

Be it known that I, FREDERICK PIERPONT SHAW, residing at Lowell, in the county of Middlesex and State of Massachusetts, have invented certain new and useful Improvements in Machines for Preparing and Spinning Worsted, of which the following description, with the accompanying drawings, is a specification.

Like numerals on the drawings denote like parts.

The invention has relation to drawing mechanism of the type that is employed in machines for preparing and spinning worsted and the like.

In particular the invention relates to the means of supporting the lower front drawing-roll of a mechanism of such type and to the fixtures which are employed in connection with the front top rolls.

The invention consists in the improvements which I will describe with reference to the accompanying drawings, in which latter I have illustrated embodiments of the same, the said drawings showing also a drawing mechanism which in general respects is of the character heretofore in use in worsted-spinning frames.

In the drawings, Figure 1, Sheet 1, shows in front elevation a portion of the length of the said drawing mechanism, the said mechanism having applied thereto an embodiment of one portion of the invention. Fig. 2, Sheet 1, is a view, mainly in end elevation, showing the parts which are located at the right-hand side of the dotted line 2 2, Fig. 1. Fig. 3, Sheet 1, is a view showing separately in end elevation the thrust-bearing which appears in Fig. 1. Fig. 24, Sheet 1, shows in side elevation, separately, on a scale somewhat smaller than that of Figs. 4, 5, &c., a cover for one of the bearings for the lower front drawing-roll having applied thereto one embodiment of a horn made adjustable in conformity with the present invention. Fig. 25, Sheet 1, shows the parts of Fig. 24 in plan; and Fig. 26, same sheet, shows the same in front elevation.

Figures 1, 2, 3, 24, 25, 26:
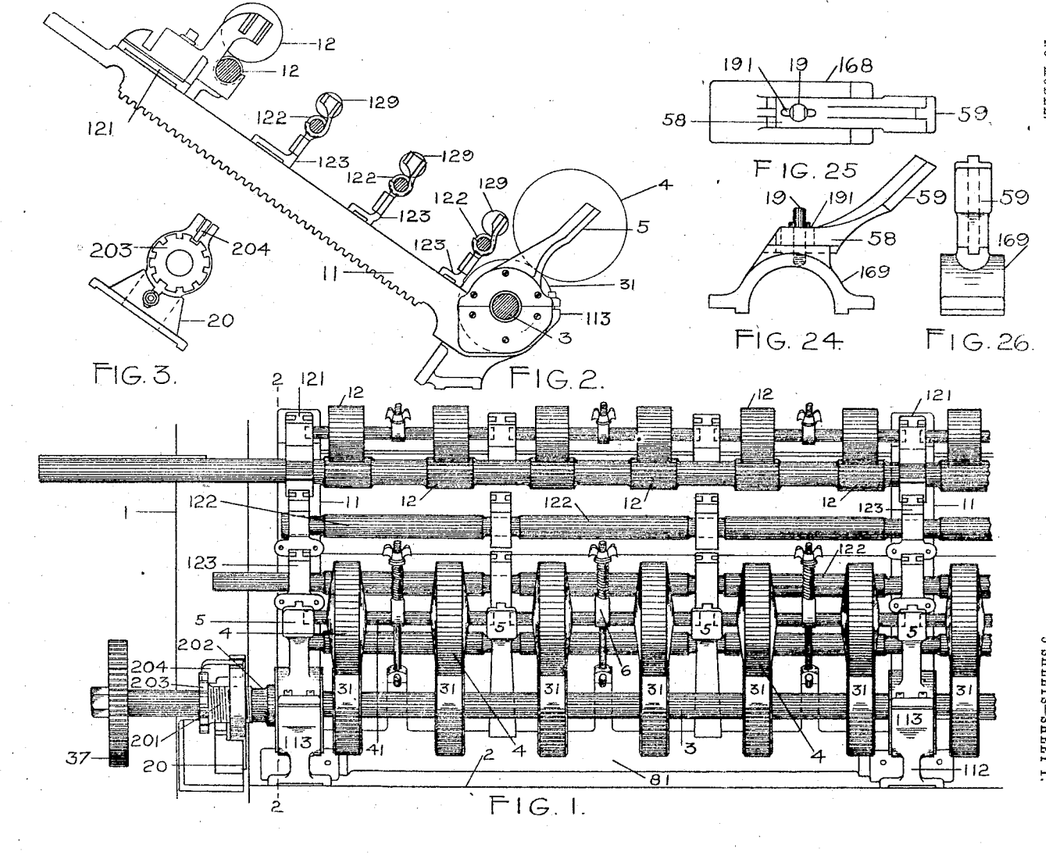
Figure 18:
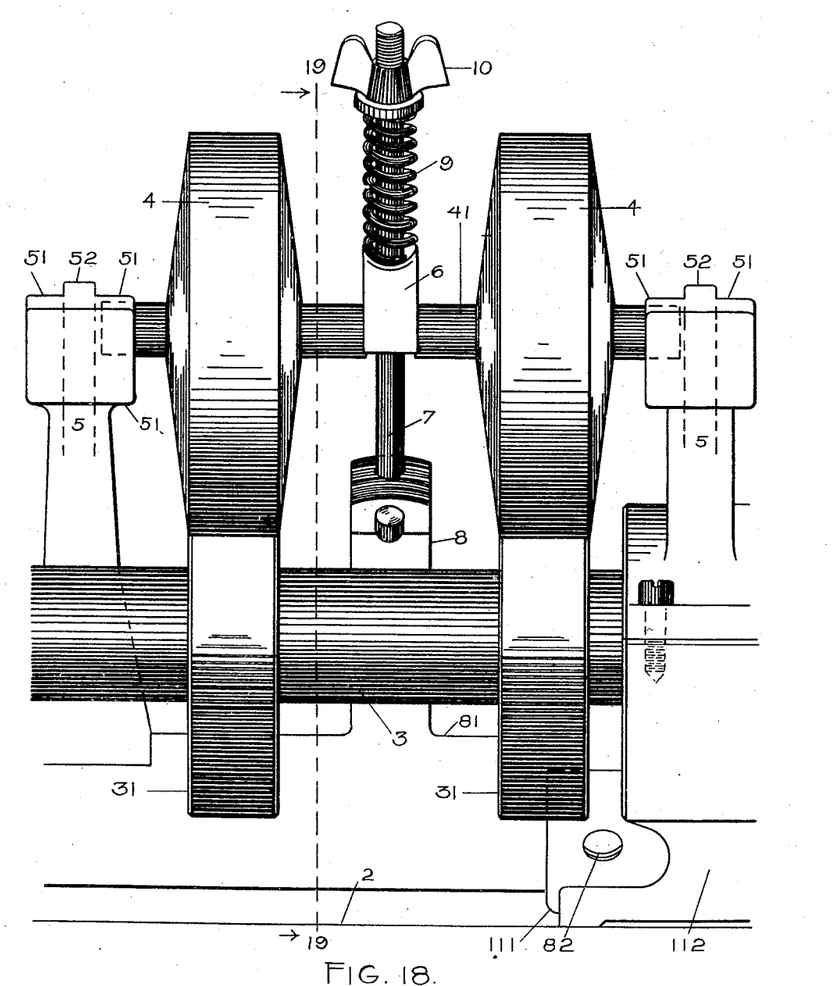
Fig. 18, Sheet 3, shows in front elevation on, an enlarged scale, a portion of the drawing mechanism embracing two bosses of the lower front drawing-roll, a bearing for the shaft of the said drawing-roll, a connected pair of top rolls applied to the said bosses, the tension or pressure device for the said top rolls, the adjacent horns for the journals of the said top rolls, and other adjoining parts.
Figures 19, 20, 21, 22, 23, 27, 28, 29:
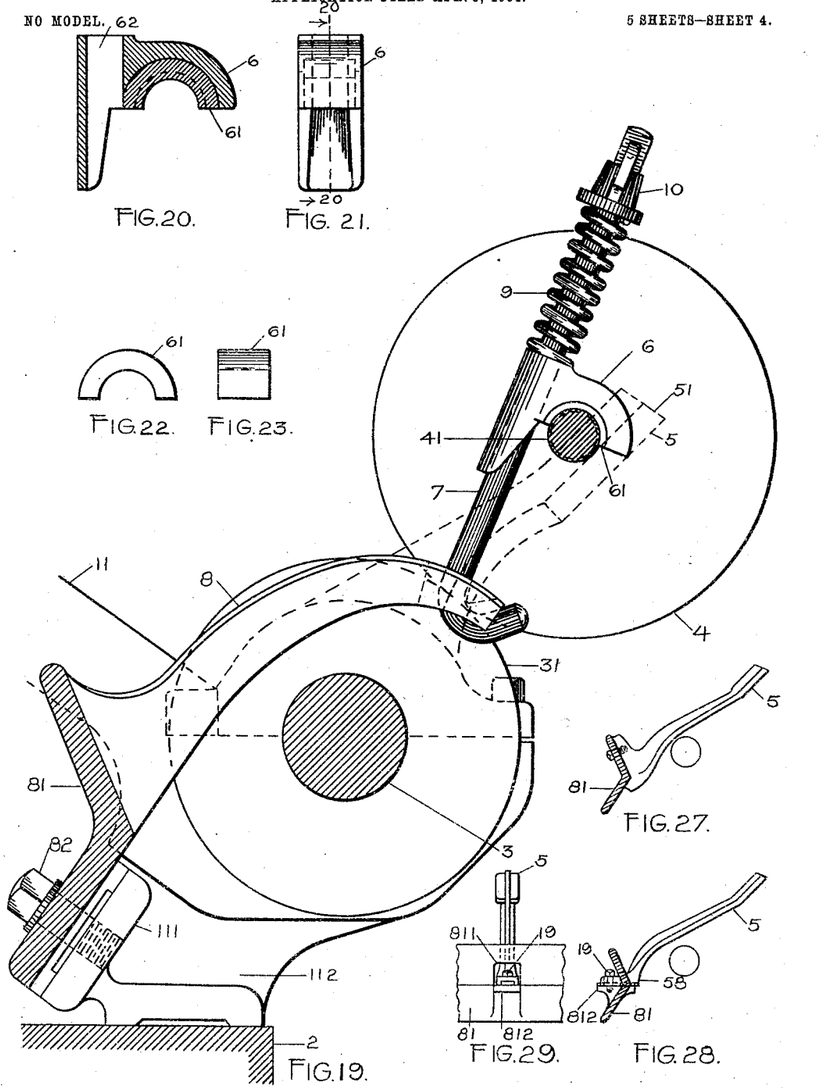
Fig. 19, Sheet 4, is a view in vertical section on the line 19 19, Fig. 18, looking in the direction that is indicated by the arrows adjacent the ends of the said line.
Fig. 20, Sheet 4, shows the saddle and its semicircular bushing in vertical section on line 20 20, Fig. 21, looking in the direction that is indicated by the arrows at the ends of such line.
Fig. 21, Sheet 4, shows in front elevation the said saddle with its semicircular bushing.
Fig. 22, Sheet 4, shows in side elevation the said bushing detached.
Fig. 23, same sheet, shows the said bushing in end elevation.
Fig. 27, Sheet 4, is a detail view, on somewhat smaller scale than Figs. 24 to 26, showing one of the horns which are located intermediate the roll-stands and portion of the rail or saddle-bar on which it is mounted, the latter being in vertical section.
Fig. 28, Sheet 4, is a view similar to Fig. 27, showing provisions for adjustment of horn.
Fig. 29, Sheet 4, shows the parts of Fig. 28 in rear elevation.

Having reference to the drawings, 1, Fig. 1, is one of the machine end frames, and 2, Figs. 1, 18, 19, &c., is a beam which extends longitudinally of the machine at the front of the latter and is attached to the fixed framework of the machine. The said beam is referred to hereinafter as the "roller-beam." Roll-stands, usually termed "carriage-stands" in the art, are shown at 11 11. A number of these is employed in the length of the machine. Their front ends are provided with feet, which rest upon and are secured to the roller-beam. Their rear ends are supported by portions of the framework which are not shown in the drawings. The rear drawing-rolls are represented at 12 12, Figs. 1 and 2.

At 121 121, Figs. 1 and 2, are shown stands for the said rear drawing-rolls. The said stands 121 121 are mounted upon the said roll-stands, being applied to the slideways or guideways with which the roll-stands are provided, and are adjustable along the said slideways or guideways in well-known manner in the direction from front to rear in the machine to increase or diminish the distance separating the said rear drawing-rolls from the front drawing-rolls.

At 122 122, &c., are shown the usual carrier-rolls, which are located intermediate the rear drawing-rolls and the front drawing-rolls, and at 123 123, &c., are shown the carrier-stands, the said carrier-stands being mounted upon the roll-stands and adjustable along the slideways or guideways of the latter in usual manner in the direction from front to rear in the machine. The usual wooden presser-rolls which are applied in practice to the carrier-rolls for the purpose of holding the slivers or rovings pressed lightly against the latter are omitted from Fig. 1, but are shown in Fig. 2 at 129 129, &c. The shaft of the lower front drawing-roll is shown at 3, and the drawing-bosses of the said drawing-roll are represented at 31 31, &c. The bearings with which the roll-stands are provided for the support of the said lower front drawing-roll will presently be described. The front top rolls which coöperate with the bosses 31 31, &c., consist, as usual, of bosses 4 4, which are attached in pairs to short shafts 41 41, &c., the ends of each shaft 41 projecting at the opposite sides of the pair of bosses thereon to constitute journals. The fixed "horns," so called, rising adjacent the bosses 31 31, &c., and constituting guides for the said journals, whereby the working positions of the front top rolls with respect to the lower front drawing-rolls are determined, are marked 5 5, &c. Certain of the said horns are applied and supported in connection with the roll-stands, as presently will be explained, while others thereof, located intermediate the roll-stands, are attached to the rail or saddle-bar 81, to which further reference will presently be made. One of the latter horns and its attachment to the said rail or saddle-bar are represented in Fig. 27, Sheet 4. The various horns are furnished, as usual, with laterally-projecting wings 51 51, against the rear faces of which the journals of the front top rolls rest, and each horn has an intermediately-located longitudinally-extending rib 52. The ribs of the respective horns serve as guides which coact with the ends of the journals of the front top rolls to prevent endwise movement of the said top rolls, and thereby fix the position, transversely considered, of the bosses 4 4 of the latter with relation to the bosses 31 31, &c., of the lower front drawing-roll. In the case of the horns which are located intermediate the extreme ones at the opposite ends of the machine the rib of each horn intervenes between and separates the adjacent journals of two adjacent pairs of front top rolls.

The bosses 4 4 of the front top rolls are pressed against the bosses 31 31 of the lower front drawing-roll by means of pressure or tension devices of usual character, a well-known form of such device being represented in position in the general view, Fig. 1, and also illustrated on a larger scale and in detail in Figs. 18 to 23 on Sheets 3 and 4. The said pressure or tension devices comprise for each pair of front top-roll bosses a saddle 6, provided with a semicircular bearing-piece 61, which is applied to the upper side of the shaft 41 of such pair of bosses intermediate the latter, a stirrup 7, having the stem thereof passed through a hole 62, Fig. 20 of Sheet 4, in said saddle and its hook-shaped lower end passed through a hole in the fixed so-called "hook" 8 and engaged with the latter, an expanding spiral spring 9 surrounding the upper portion of the said stem above the saddle and a thumb-nut 10 screwed upon the threaded upper end of the stirrup, the said spring being compressed between the thumb-nut and the saddle and its tension being adjusted by means of the said thumb-nut to secure the desired pressure of the top-roll bosses 4 4 against the bosses 31 31. The bearing-piece 61 is formed of wood impregnated with a lubricant and is seated in a pocket or recess that is formed for its reception in the under side of the body of the saddle. In the illustrated construction, except in Figs. 32 and 33, Sheet 5, the hook 8 is integral with the rail 81, which usually is termed a "saddle-bar," and is located at the rear of the lower front drawing-roll. The said saddle-bar extends lengthwise of the machine and is formed with the hooks for a number of pairs of front top-roll bosses. It is of a length sufficient to extend from one roll-stand to the next, and at its ends it is fastened by bolts 82, Figs. 18 and 19, to lugs 111, Figs. 4, 5, 18, and 19, with which the foot portions 112 of the said roll-stands are furnished. Similar pressure or tension devices, which are indicated in part in Fig. 1, are employed in connection with the rear top drawing-rolls. The parts thus far referred to and their arrangement and general relations are or may be as heretofore or as preferred, except as regards the bearings for the shaft of the lower front drawing-roll and the horns.

Referring now to the bearings for the shaft 3 of the lower front drawing-roll, the said bearings are shown in the drawings as provided in forward extensions 113 113 of the roll-stand, as heretofore. (See Figs. 1 and 2, Sheet 1, and Figs. 4 and 5, Sheet 2.) It is not material to the present invention whether the supports for the said bearings are integral with the roll-stands, as shown, or are otherwise constructed. The bearings are shown located, as heretofore, in front of the lower ends of the slideways or guideways on which the stands 121 123, &c., are mounted. In the usual construction the horns at the respective roll-stands rise from the latter at the rear of the bearings between the latter and the said lower ends of the slideways or guideways. As is well known, the stands 121 are adjustable along the slideways or guideways of the roll-stands toward and from the front drawing-rolls for the purpose of enabling the distance which separates the rear drawing-rolls from the front drawing-rolls to be varied when required in order to suit the length of the fibers which are being operated upon. This change in the position of the stands 121 and rear drawing-rolls supported thereby is accompanied by an adjustment of the carrier-stands 123 123, by which the carrier-rolls are shifted into positions intermediate the front drawing-rolls and rear drawing-rolls to correspond with the new position of the rear drawing-rolls. Sometimes it is necessary to work with the bite of the front carrier-roll 122 and its presser-roll 129 as close to the bite of the front drawing-rolls as is possible without actual contact of the peripheries of the said carrier-roll and presser-roll with the peripheries of the bosses of the front drawing-rolls. This involves a very close approach of the front carrier-stands to the axis of the shaft of the lower front drawing-roll. In order to permit the required closeness of approach, it is necessary in the case of the usual construction above referred to that at each bearing the lower portion or post of the corresponding horn and the portion of the bearing which is located rearward of the journal portion of the shaft 3 should together occupy a very small space, measuring in the direction from front to rear in the machine. For this reason in the previous constructions of drawing mechanism of the class to which the invention refers it has been found necessary to employ for the support of the lower front drawing-roll bearings occupying the smallest possible extent of space rearward of the journal portions of the said drawing-roll. In all cases known to me plain or simple bearings have invariably been employed in practice heretofore in the said connection. For want of room for the convenient attachment and fitting of covers in front of the horns also the bearings heretofore have been left unprovided with covers or open-topped, so far as I have observed in practice. In the operation of such previous constructions the portions of the shaft of the lower front drawing-roll which work in the said open-topped bearings become covered with lubricant. Dust and flyings collect upon such portions in consequence of their being without covering. As a result the lubricant of the bearings becomes charged with impurities, which clog the bearings and cause cutting of the shaft and the bearing, as well as occasion other injuries. In particular the cutting of the shaft and bearings by particles of wool which work in between them is an extensive and serious cause of trouble and progresses rapidly.

By the action of the pressure or tension devices which are employed in connection with the front top rolls to compress the latter against the drawing-bosses of the said lower drawing-roll, so as to occasion a proper nip of the fibers passing between the top rolls and the said bosses, the journal portions of the roll are borne with considerable pressure against the surface of the bearings. This pressure operates to cause the lubricant to be stripped from the coacting surfaces of the said journal portions and the said bearings, thus permitting the metal of the roll to contact directly with that of the bearing, from which much friction and wear result. A great deal of driving power is consumed in overcoming merely the resistance which is due to the friction of the lower front drawing-roll in its bearings, even when the bearings are clean and in good condition and the coacting surfaces are well lubricated. The amount of power thus consumed is considerably increased when the bearings become clogged, as aforesaid, or become worn or otherwise get out of order and also when the coacting surfaces become stripped of lubricant. Furthermore, I have ascertained that to the resistance which is offered to the rotation of the lower front drawing-roll in the bearings which heretofore have been employed is due the production of a great deal of defective yarn—that is to say, the length of the lower front drawing-roll is considerable, and a good many bearings are employed for its support, while in practice usually driving power is applied to one end only of the roll through the agency of gearing in engagement with a gear-wheel, as 37, Fig. 1, fast upon such end. The said resistance occasions considerable torsional straining or springing of the said roll in the course of its length, the said straining or springing increasing in extent or amount in proportion to the distance from the driving end of the roll. The tendency of the bearings to hold the various portions of the length of the roll from turning acts temporarily to retard the respective portions of the roll in their rotation to an extent which is proportionate to the distance of such portions from the driving end of the roll, or may even momentarily stop the rotation of a boss or bosses at or near the farther end of the roll, thus diminishing or even arresting the delivery of sliver or roving at the corresponding bosses until the torsional tension (moment of torsion) within the roll-shaft has become sufficiently great to overcome the resistance, whereupon the roll starts around, making a sudden advance and corresponding delivery of sliver or roving. The result of the variable delivery of the sliver or roving is the production of thick and thin places in the yarns which are made from the said sliver or roving.

One general object of the present invention is to provide a construction of a character which shall obviate the limitations and restrictions with respect to the bearings which heretofore have existed, which shall enable bearings of any approved proportions and character to be employed, and, more especially, shall render possible and practicable the employment of roller-bearings in connection with the lower front drawing-roll in lieu of plain bearings, whereby to obviate the disadvantages of the latter, and especially to reduce the resistance which is offered at the bearings to the rotation of the said roll, so as to enable the power that is required for the purpose of rotating the lower front drawing-roll to be reduced very much in amount and also to obviate the torsion or twisting of the roll-shaft and the resulting production of defective yarn. Another is to facilitate the application of covers to the bearings in order that dust and flyings, as well as other injurious bodies, may be excluded from the bearings.

The horn projects from its support in a manner exposing it to accidental blows and the like, and breaking thereof occurs occasionally. Breakage or other injury in the case of a horn which is integral with the roll-stand or carriage-stand necessitates replacement of the entire roll-stand by a new one, which can be effected only through extensive dismantling of the drawing mechanism, entailing more or less loss of use of the machine and the expenditure of considerable time and labor in addition to the cost of the new roll-stand.

A further object of the invention is to obviate this drawback and to provide a construction which shall be less subject to breakage of the horn or other like fixture which is provided in connection with each bearing than the construction heretofore in use and which, if injury or breakage occurs, shall enable the injured or broken part to be removed and a new one substituted conveniently and in most cases without suspending the operation of the machine.

A further object of the invention is to furnish provisions for enabling the working position of the front top-rolls to be shifted or adjusted angularly about the axis of the lower front drawing-roll as may be found necessary or desirable for the attainment of the best results in practice.

Having regard now to the matter of employing roller-bearings or covers, as aforesaid, I would note that a serious obstacle to the application of a roller-bearing in lieu of the plain bearing ordinarily in use is the fact that roller-bearings necessarily occupy considerable space in radial direction, and consequently a roller-bearing employed in connection with a lower front drawing-roll, as explained hereinafter, occupies at the front and rear of the roll-shaft more space radially than a plain bearing requires to occupy. With a roller-bearing employed the usual horn at the rear of the bearing would require to occupy a position at such a distance behind the roll-shaft that it would constitute an obstruction that would make it impossible to adjust the front carrier-stands forward far enough to place the front carrier-rolls as close to the bite of the front drawing-rolls as sometimes is required.

In carrying my invention into effect I remove the horn which is employed adjacent each bearing for the lower front drawing-roll from its customary position upon the roll-stand at the rear of the bearing. This enables the rear portion of the bearing to occupy the space which heretofore has been occupied by the lower portion of the horn, and thus permits the bearing to project farther to the rear than heretofore. Thereby room is afforded for the accommodation of the relatively greater proportions of a roller-bearing, also for the convenient application of a suitable cover.

Figures 4, 5, 6, 7, 8, 9, 10, 11, 12, 13, 14, 15, 16, 17:
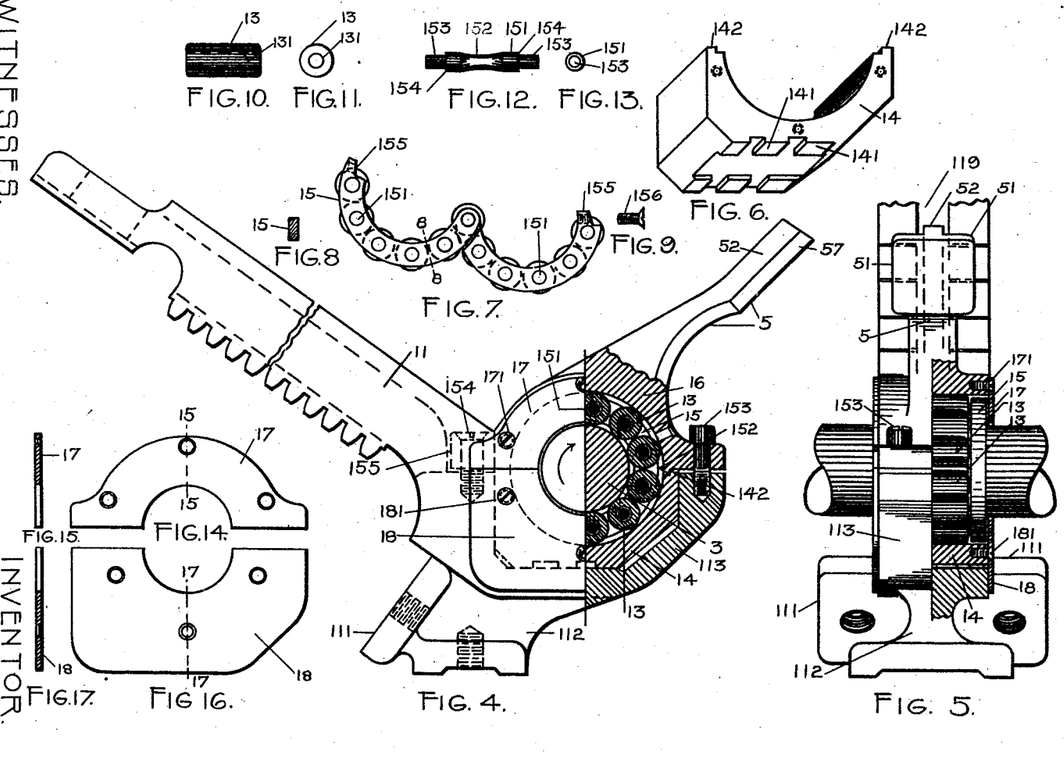
Fig. 4, Sheet 2, is a view showing, on a larger scale than Figs. 1 to 3, a roll-stand or carriage-stand and its bearing for the shaft of the lower front drawing-roll, mainly in side elevation, and the shaft of the lower front drawing-roll, partly in vertical section, with portions of the said roll-stand and of the said bearing at one side of the axis of the said drawing-roll in section on a vertical plane in order to enable the interior construction to be represented.
Fig. 5, Sheet 2, is a view, mainly in front elevation, of the parts which are shown in Fig. 4, certain portions at one side of the middle of the bearing being represented in section on a transverse vertical plane and the rear end of the roll-stand or carriage-stand being broken away.
Fig. 6, Sheet 2, is an isometric of the half-box of the roller-bearing which is represented in Figs. 4 and 5.
Fig. 7, Sheet 2, shows in side elevation, opened out, the cage of the roller-bearing of Figs. 4 and 5.
Fig. 8, Sheet 2, is a view in cross-section on line 8 8, Fig. 7.
Fig. 9, Sheet 2, shows one of the screws for securing the cage in its closed condition.
Figs. 10 and 11, Sheet 2, show one of the rollers of the roller-bearing in side and end elevation, respectively.
Figs. 12 and 13, Sheet 2, show a roller-supporting pin in side and end elevation, respectively.
Fig. 14, Sheet 2, shows in side elevation the upper one of the two casing-plates which are applied at each end of the roller-bearing.
Fig. 15, same sheet, is a view showing the said casing-plate in vertical section along the line 15 15 of Fig. 14.
Fig. 16, Sheet 2, shows in side elevation the lower one of the said casing-plates.
Fig. 17, same sheet, shows the same in vertical section on the line 17 17 of Fig. 16.

I will explain a convenient form of roller-bearing and its cover and then will describe the manner and means of carrying into effect the improvements which I have effected in connection with the horn or the like top-roll fixture which is employed in connection with a bearing. Reference will be had more particularly to Sheet 2 of the drawings, on which are shown a roll-stand and bearing, a cover, and a horn, together with the details of the construction of the bearings. 13 13, &c., Figs. 4 and 5, said sheet, are antifriction-rolls arranged in a circular series surrounding the journal portion of the shaft 3 of the lower front drawing-roll, and 14 is a half-box occupying a recess in the forward extension 113 of the roll-stand 11 and having a concave face which is concentric with the said journal portion. The rolls 13, 13, &c. bear upon the said concave face as they travel around in the rotation of the shaft 3. The half-box 14 is shown detached in Fig. 6. It is furnished on its bottom with filing portions 141 141, &c., which may be more or less completely filed or ground away when it is necessary to adjust the half-box into a lower position in alining the shaft 3. If it is necessary to raise the half-box slightly, this may be effected by inserting a liner of thin sheet material—such, for instance, as paper or sheet-steel—between the bottom of the recess and the under side of the half-box. The rolls 13 13, &c., are held spaced at the proper distance apart from one another around the journal portion of the shaft 3 and are kept parallel with the axis of the said shaft by means of a cage comprising a pair of annular ends 15, Figs. 4, 5, and 7, which are constructed to encircle the said journal portion, and supporting-pins 151 151, which extend from one annular end 15 to the other and receive the rolls thereon between the said annular ends, the rolls being bored centrally throughout their length, as at 131, Figs. 10 and 11, for the passage of the supporting-pins therethrough. Each supporting-pin 151 is reduced in diameter throughout the greater portion of its length, as at 152, Fig. 12, to lessen the extent of surface contact with the interior of the corresponding roll 13, leaving comparatively narrow bearing portions adjacent its opposite ends. Each of the said supporting-pins, moreover, has its end portions reduced in diameter, as at 153 153, leaving shoulders, as 154 154. The said reduced end portions are inserted into holes which are formed for their reception in the annular ends 15, and the extremities of the said end portions are upset within the slightly-enlarged or counterbored outer portions of the said holes to secure the pins to the said annular ends. The shoulders 154 154 by their engagement with the inner sides of the annular ends 15 hold the latter spaced at the required distance apart. For convenience in applying the cage, with its rolls, to the shaft 3 and subsequently effecting the removal thereof the cage is formed in two semicylindrical sections by making each annular end 15 thereof in two segments, as indicated in Fig. 7, and the said sections are hinged together at one side of the center of the cage by one of the supporting-pins 151, the meeting ends of the said segments at the said side of the center being caused to overlap side by side, so that each end portion of the said pin may pass through the pair of meeting ends of the segments at the corresponding end of the cage. For the purpose of securing the cage in closed condition I have shown the free ends of the segments of each annular end 15 formed with projections 155 155, Fig. 7, one of which overlies the other circumferentially when the cage is closed, and a securing-screw 156, Fig. 9, is turned into the said overlapping projections. At 16 is shown a cover. This extends over the upper portion of the series of antifriction-rolls and is fitted to the top of the half-box 14 at front and rear of the shaft 3. The meeting portions of the half-box and cover are formed at front and rear with bearing or contact lips 142 152, those at the front of the half-box and cover being represented in Fig. 4 and both of those of the half-box being shown in Fig. 6. The said lips secure the correct fit of the cover to the half-box. The cover is held in place by screws 153 154. The screws 153 pass through vertical holes in a forwardly-projecting portion or lug at the front end of the cover and enter into screw-threaded holes which are tapped into the front part of extension 113 of the roll-stand. The screws 154 pass through vertical holes in a rearwardly-projecting lug 155 at the rear end of the cover into threaded holes tapped into the roll-stand at the rear of the shaft 3. In order to permit the fastenings at the rear of the shaft 3 to be employed, the lug 155 is caused to enter the forward portion of the longitudinal slot 119, Fig. 5, which is formed vertically through the inclined body portion of the roll-stand for the reception of the foot portion of the carrier-stands, &c., and their securing-bolts. Ordinarily the cover will not take bearing directly against the roll-stand at either the front or rear of the shaft 3. A clearance-space will be left between the projections or lugs of the cover and the upper surfaces of the adjacent horizontal portions of the said roll-stand, as indicated in Fig. 4, sufficient to permit the cover to be adjusted to keep the same in close contact with the half-box 14 by tightening up the screws 153 154, when the half-box is adjusted by filing away the portions 141 141, &c., or taking out liners from underneath the half-box. Suitable end casing-plates 17, (Figs. 4, 14, and 15,) and 18, Figs. 4, 5, 16, and 17, are attached by screws 171 181 to the opposite sides of the cover 16 and half-box, respectively, to prevent the entrance of dust, &c., at opposite ends of the bearing.

In conformity with one portion of the present invention the horn which is employed in connection with the bearing is attached to the cover 16. This secures a double purpose. In the first place, it enables the base of the said horn conveniently to be located elsewhere than in its customary position at the rear of the lower front drawing-roll. In the second place, since the said cover is detachable the horn may be removed from its working position whenever such removal is desirable for greater convenience in gaining access to other parts or for other reasons. An important advantage is the fact that in case of breakage of the horn a new cover and horn may be quickly substituted without it being necessary to do more than temporarily remove the adjacent pair or pairs of top rolls and their tension or pressure devices. In such cases it is necessary to suspend only the drawing or drawing and spinning of the corresponding slivers or rovings, the remainder of the machine remaining in full and uninterrupted operation. The cost of a new cover and horn, it will be apparent, is small as compared with that of an entire roll-stand. In Figs. 1, 4, and 5 the horn is shown formed integral with the cover. Figs. 24, 25, and 26 show a construction in which the horn (here designated 59) instead of being formed integral with the cover (here designated 169) is separately formed and detachably connected thereto. This construction has the advantage that the horn may be removed from the cover and afterward restored to position or replaced by a fresh one whenever necessary without it being required to disconnect the cover from the stand containing the bearing, so that in case of injury to the horn or breakage therefor of a new one may be substituted therefor with a minimum of trouble and expense and without removing or discarding the cover. The mode of fitting and connecting the horn detachably to the cover may vary in practice. In the present instance the meeting surfaces of the top of the cover and foot portion 58 of the horn are tongued and grooved to prevent the horn from turning or twisting relative to the cover, and the horn is attached to the cover by means of a screw 19, the stem of which passes down through a slot 191, that is formed in the said foot portion 58 of the horn, into a threaded hole that is tapped in the top of the cover. In this embodiment of the invention is contained that feature of the invention which involves making provision for adjustment of the horns in the direction from front to rear in the machine. Thus the slot 191 is shown elongated in the said direction, so as to permit the horn to be shifted either forward or back and secured in the desired position.

Figs. 28 and 29, Sheet 4, illustrate similar provisions for adjustment in connection with one of the horns which are located intermediate the roll-stands. In these figures the rail or saddle-bar 81 is formed with an opening 811 to receive the foot portion 58 of the intermediate horn and with a shoulder 812, upon which the said foot portion is caused to rest, the horn being secured and adjusted in the direction from front to rear in the manner already described in connection with Figs. 24, 25, and 26. The provisions for adjustment of the horns enable the position of the top rolls to be adjusted as may be required for the attainment of the best results in the working of the mechanism. This capacity for adjustment enables me to secure the proper relation of a horn with respect of the line of draft of the tension devices, so that the journals of the front top rolls shall neither bear with undue force against the surfaces of the wings of the horn nor tend to separate therefrom.

Figures 30, 31, 32, 33:
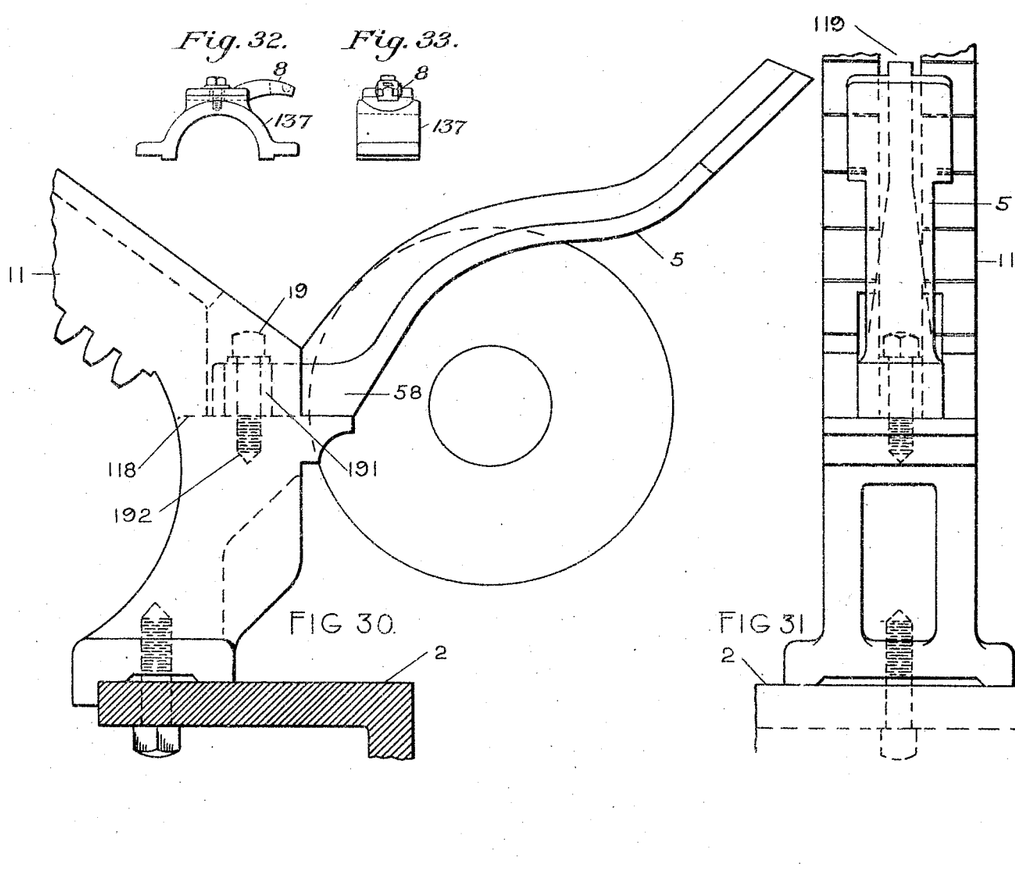
Fig. 30, Sheet 5, shows in side elevation the forward end of a roll-stand with a horn adjustably mounted thereon, the roller-beam being partly represented in vertical section.
Fig. 31, Sheet 5, shows the parts of Fig. 30 in front elevation.
Figs. 32 and 33, Sheet 5, show in side elevation and front elevation, respectively, a cover having a hook mounted thereon.

Figs. 30 and 31, Sheet 5, illustrate a separate horn, which is detachably mounted upon a roll-stand, with capacity for adjustment thereon in the direction from front to rear in the machine. In these figures the foot 58 of the horn is entered within the slot 119 of the roll-stand, it fitting between the opposite side portions of the roll-stands. The said foot rests upon the horizontal ledge 118 and is secured in place by the screw 19, the stem of which extends through the slot 191 of the said foot and enters a threaded hole 192, which is tapped vertically into the roll-stand. The slot 191 permits the adjustment of the horn toward the front or rear, as may be required.

In my companion application for United States Letters Patent for improvements in machines for preparing and spinning worsted, filed April 5, 1904, Serial No. 201,735, I have illustrated horns which are mounted upon the roller-beam and have shown and described provisions for effecting adjustment of such horns in substantial conformity with the portion of the present invention which has reference to such adjustment. It is to be understood that I do not limit myself with respect to the particular character of the support for the horn, so far as this portion of my invention is concerned.

To a certain extent the horns 5 and hooks 8 are interchangeable in position with relation to the bearings. In other words, in cases in which it is desired that the top rolls, horns, hooks, and tension or pressure devices shall be so arranged as to cause the said tension or pressure devices to act in line vertically with a bearing—as, for instance, in my application for United States Letters Patent for improvements in machines for preparing and spinning worsted, filed April 5, 1904, Serial No. 201,736—a hook 8 may be mounted upon the cover 137 of a bearing in conformity with the invention which is described and claimed in the said application, as shown herein in Figs. 32 and 33, Sheet 5. In the said figures the arrangement otherwise is essentially similar to that in Figs. 24 to 26, Sheet 1, the said hook being removably applied and also adjustable in the direction from front to rear. My invention in its broader phase will be embodied equally in the case of Figs. 32 and 33, for, as will be perceived, the essential principles of the same are contained in the construction which is shown in the latter figures. For this reason, therefore, I designate both the horn and the hook as "top-roll fixtures," and by the term "top-roll fixture" as employed in certain of the claims I contemplate as well a hook as a horn for the purpose of such claims.

For the purpose of preventing the lower front drawing-roll from working endwise in the machine a thrust-bearing is provided therefor, comprising, essentially, a stand 20, Figs. 1 and 3, having an upward extension through which is formed a transverse opening somewhat larger in diameter than the shaft of the said roll. The wall of this opening is screw-threaded, and to the same is fitted the externally-threaded sleeve 201. The latter surrounds the shaft of the lower front drawing-roll and bears at its inner end against the outer side of a collar 202, which surrounds the said shaft and is shrunk thereon or otherwise made fast thereto.

The sleeve is furnished at its outer end with a radially-enlarged collar or flange 203 for convenience in turning the sleeve by hand for purpose of adjustment. The said collar or flange is formed with a series of radial notches to receive the engaging portion of a locking device or latch 204, which latter is pivotally connected with the said stand 20.

What I claim is—

1. In a drawing mechanism, in combination, a lower front drawing-roll, a bearing therefor, a cover for the said bearing provided with a front top-roll fixture carried by and extending forward therefrom, and front top rolls in operative engagement with the said fixture.

2. In a drawing mechanism, in combination, a lower front drawing-roll, top rolls applied to the said drawing-roll, a bearing for the said drawing-roll, and a cover for the said bearing provided with a horn projecting therefrom for engagement with the top-roll journals.

3. In a drawing mechanism, in combination, a lower front drawing-roll, a bearing therefor, a cover for the said bearing, a top-roll fixture removably attached to the said cover, and front top rolls in operative engagement with the said fixture.

4. In a drawing mechanism, in combination, a lower front drawing-roll, top rolls applied to the said drawing-roll, a bearing for the said drawing-roll, a cover for the said bearing, and a horn for engagement with the top-roll journals removably secured to the said cover.

5. In a drawing mechanism, in combination, a lower front drawing-roll, a bearing therefor, a top-roll fixture having provisions to adjust the same in the direction from front to rear, and front top rolls in operative engagement with the said fixture.

6. In a drawing mechanism, in combination, a lower front drawing-roll, top rolls applied to the said drawing-roll, and a horn for engagement with the top-roll journals having provisions for adjustment thereof in the direction from front to rear to vary the position of the top rolls relative to the lower front drawing-roll in such direction.

7. In a drawing mechanism, in combination, a lower front drawing-roll, a bearing therefor, a cover for the said bearing, a top-roll fixture mounted upon the said cover and having provisions to adjust the same in the direction from front to rear, and front top rolls in operative engagement with the said fixture.

8. In a drawing mechanism, in combination, a lower front drawing-roll, top rolls applied to the said drawing-roll, a bearing for the said drawing-roll, a cover for the said bearing, a horn projecting from the said cover for engagement with the top-roll journals, and means to adjust the said horn upon the said cover in the direction from front to rear, to vary the position of the top rolls in such direction.

In testimony whereof I affix my signature in the presence of two witnesses.

FREDERICK PIERPONT SHAW.

Witnesses:
ESTHER PERRY TAYLOR,
IRVING DUNNING KIMBALL.